Feb. 3, 1931.  L. MATLOCK  1,790,992
CUSHION TIRE
Filed Feb. 23, 1929

Leonard Matlock
Inventor

By C. A. Snow & Co.
Attorneys.

Patented Feb. 3, 1931

1,790,992

UNITED STATES PATENT OFFICE

LEONARD MATLOCK, OF RANKIN, TEXAS

CUSHION TIRE

Application filed February 23, 1929. Serial No. 342,189.

This invention relates to cushion tires, and aims to provide a novel form of puncture proof tire possessing resilient qualities equal to the resilient qualities of the well known pneumatic tire.

An important object of the invention is to provide a tire of the resilient type, eliminating the necessity of using an inner tube to render the tire resilient.

A further object of the invention is to provide a tire constructed of the usual cord base and a reenforcing member in the form of a coiled wire, and an outer reinforcing member embodying a plurality of spaced wires of various lengths embedded in the body portion of the tire adjacent to the tread thereof, to reinforce the tire casing against rupture by contact with enlargements in the road surface over which the tire is moving, but at the same time lend resiliency to the tire.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
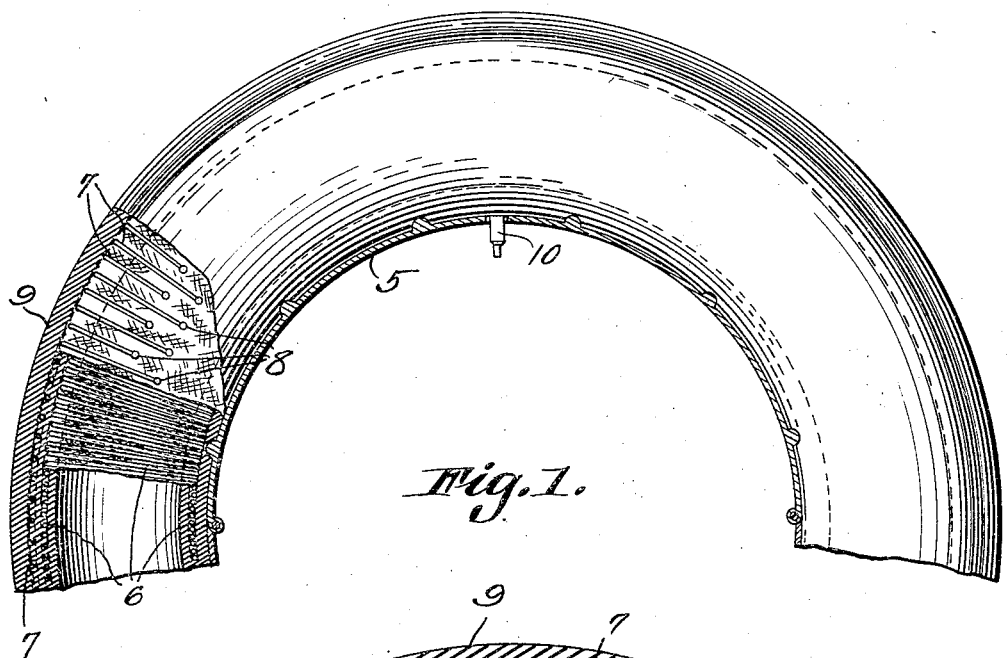
Figure 1 is a fragmental elevational view of a tire constructed in accordance with the invention, a portion thereof being broken away illustrating the position of the wires.
Figure 2:
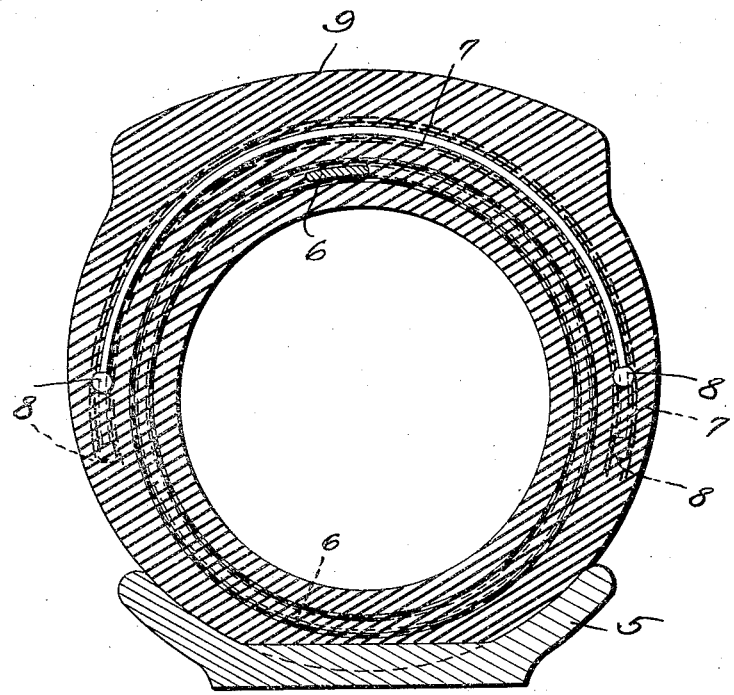
Figure 2 is a transverse sectional view through the tire and rim.

Referring to the drawing in detail, the reference character 5 designates a rim, on which the tire, forming the essence of the present invention, is positioned.

The tire is built up in the usual manner and includes layers of rubberized cords in which the member 6 is embedded, the member 6 embodying a length of wire coiled within the casing, the coil being continuous throughout the diameter of the body portion of the tire.

Lengths of wire material indicated at 7 are also embedded in the body portion of the tire, the lengths of wire 7 being disposed in spaced relation with the continuous wire 6 so that the wire 6 will not interfere with the action of the wires 7 when the tire is flexing.

These wires 7 are arranged in spaced relation with each other, alternate wires being of the same lengths to the end that certain wires 7 are shorter than the adjacent wires 7 defining a greater space between the ends of the wires 7 and allowing the ready flexing of the wires 7.

Balls 8 or enlargements are formed at the ends of the wires 7, which balls lock the wires 7 in position, and at the same time protect the material of which the casing is formed, against undue wear, and damage by the pointed ends of the wires.

The tread of the tire is indicated at 9 and embodies the usual cord and rubber construction now in use in the manufacture of cord tires. Owing to the construction of the wires 7 it is obvious that the portion of the tire casing between the ends of the wires 7 and rim is free to flex readily under the impact or force directed to the tire when the tire moves over enlargements or obstructions in a road surface.

A valve stem indicated at 10 forms a part of the tire and establishes communication between the interior of the tire and atmosphere so that the tire may be inflated during the construction thereof which inflation results in the drying of the tire.

I claim:

1. A cushion tire comprising a casing, alternate long and short wires embedded in the tread portion of the casing, and balls at the ends of the wires to anchor the wires in the casing.

2. A cushion tire comprising a casing, alternate long and short wires embedded in the tread portion of the casing, said wires being arranged in spaced relation with each other and disposed transversely of the tire, and balls at the ends of the wires to anchor the wires in the casing.

In testimony that I claim the foregoing as my own, I have hereto affixed my signature.

LEONARD MATLOCK.